United States Patent [19]

Kasuga et al.

[11] 4,436,877

[45] Mar. 13, 1984

[54] THERMOPLASTIC POLYESTER COMPOSITION

[75] Inventors: Takuzo Kasuga, Tokyo; Katsuhiko Takahashi, Fuji; Tuneyasu Nakashima, Kawasaki, all of Japan

[73] Assignee: Polyplastics Co., Ltd., Japan

[21] Appl. No.: 440,132

[22] Filed: Nov. 8, 1982

[51] Int. Cl.³ .............................................. C08G 63/76
[52] U.S. Cl. .................................... 525/437; 528/289; 528/308.1; 528/308.2
[58] Field of Search .................. 528/289, 308.1, 308.2; 525/437

[56] References Cited

U.S. PATENT DOCUMENTS

| | | | |
|---|---|---|---|
| 4,309,529 | 1/1982 | Wendling | 528/289 |
| 4,316,952 | 2/1982 | Wendling | 528/289 X |
| 4,350,806 | 9/1982 | Wagener | 525/437 X |
| 4,362,852 | 12/1982 | Pendlebury et al. | 525/437 |

*Primary Examiner*—Lucille M. Phynes
*Attorney, Agent, or Firm*—Maria C. H. Lin; Andrew F. Sayko, Jr.

[57] ABSTRACT

A thermoplastic polyester composition comprising a thermoplastic polyester resin containing a moiety derived from an aromatic dibasic acid, as a predominant acid moiety and a hydantoin compound in an amount sufficient to substantially retard evolution of aromatic dibasic acid vapor during melt processing of the composition. A method of preventing mold deposits during a molding operation of a thermoplastic polyester resin containing an aromatic dibasic acid as a predominant acid moiety comprising the addition of 0.01 to 10 parts by weight of a hydantoin compound per 100 parts by weight of the polyester resin. The aromatic dibasic acid is preferably terephthalic acid and the thermoplastic polyester resin is preferably selected from the group of polyethylene terephthalate, polytrimethylene terephthalate, polytetramethylene terephthalate and blends thereof.

18 Claims, No Drawings

THERMOPLASTIC POLYESTER COMPOSITION

The present invention relates to a polyester resin composition having improved molding properties.

High polymeric or copolymeric polyesters derived from an alkylene glycol and terephthalic acid or isophthalic acid have been employed as engineering plastics in a wide variety of applications due to their excellent mechanical and electrical properties and excellent molding properties. Among these polyester resins, polybutylene terephthalate resins derived from 1,4-butanediol and terephthalic acid or its derivative have been found to be especially versatile as resins suitable for use in injection molding because they have a high degree of crystallinity, good molding properties and good affinity for inorganic fillers such as glass fibers. Further their physical properties such as mechanical properties and heat deflection temperature can be improved by incorporation of such fillers, and they can readily be rendered flame-retardant without substantial loss of their physical properties.

However, when these resins are used in large amounts and for prolonged periods of time in molding applications, the gas evolved from the molten resin, which is predominantly comprised of aromatic dibasic acid such as terephthalic acid, deposits on the mold during molding operation and has detrimental effects such as loss of surface Smoothness of the resulting moldings and corrosion of the molds. In order to reduce such detrimental effects, the molds have to be cleaned very frequently and this is a serious problem from the viewpoint of production efficiency and economy.

One object of the present invention is to provide a thermoplastic polyester resin composition which comprises a polyester resin containing a moiety derived from an aromatic dibasic acid such as terephthalic acid as a predominant acidic moiety and which, has improved molding properties.

Another object of the present invention is to provide a polyester composition capable of undergoing melt processing such as injection molding with less evolution of vapor of the aromatic dibasic acid moiety, which may cause corrosion of the mold or otherwise adversely affect the melt processing.

It is a further object of the invention to provide a polyester composition which can be injection molded without having to clean the mold so often, which contributes to less down time and a more efficient and economical molding operation and ultimately to saving of resources.

These and other objects, as well as the scope, nature, and utilization of the present invention, will be apparent to those skilled in the art from the following detailed description.

It has now been found that the evolution of an aromatic dibasic acid vapor, e.g., terephthalic acid vapor, encountered during the molding of a polymeric or copolymeric polyester resin, can be controlled very effectively by incorporation of a small amount of a hydantoin compound in the resin.

Thus, in one aspect of the present invention, there is provided a thermoplastic polyester composition comprising (a) a thermoplastic polyester resin which contains a moiety derived from an aromatic dibasic acid as a predominant acidic moiety, and (b) a hydantoin compound in an amount sufficient to substantially retard evolution of aromatic dibasic acid vapor during melt processing of the composition.

The hydantoin compound used in the composition of the present invention includes hydantoin and substituted compounds thereof. They may be either low molecular weight or high molecular weight and may contain one or more hydantoin moieties in each molecule. The substituted hydantoin compounds include those having one or more substituents such as alkyl or aryl groups attached to the carbon atom at the 5-position and/or the nitrogen atoms at the 1- and/or 3-position of the hydantoin nucleus. Examples of suitable hydantoin compounds are hydantoin and those hydantoin compounds having a substituent at the 5-position. These hydantoin compounds may be derived from an α-aminoacid. Particularly useful are phenylhydantoin and p-hydroxyphenylhydantoin which may be derived from phenylglycine and p-hydroxyphenylglycine, respectively.

As previously set forth, the hydantoin compound should be present in an amount sufficient to substantially retard evolution of vapor of the aromatic dibasic acid such as terephthalic acid during melt processing of the polyester composition. However, if present in too large an amount, some hydantoin compounds may be vaporized along with terephthalic acid and be present in the evolved gas. Accordingly, the amount of the hydantoin compound to be used should be carefully decided, particularly when the hydantoin compound is a relatively volatile, low molecular weight one. Such amount may readily be determined by those skilled in the art by experiment.

In general, from 0.01 to 10 parts of a hydantoin compound per 100 parts of the polyester resin has been found effective for the intended purpose. Usually the hydantoin compound is incorporated in an amount of from 0.01 to 5 parts, preferably from 0.01 to 2 parts per 100 parts of the resin. In the description given herein, all the parts are by weight.

The polyester resin base material of the composition of the present invention includes polyalkylene terephthalates such as polyethylene terephthalate, polytrimethylene terephthalate, polybutylene terephthalate, etc. as well as blends thereof.

These polyester resins may be modified by replacing part of the glycol and/or dicarboxylic acid component by other glycol and/or dicarboxylic acid component up to a total of 20% of the resin. The glycol components useful for modification of the polyesters include aliphatic, alicyclic or aromatic glycols such as neopentyl glycol, 1,4-dimethylolcyclohexane, 2-methylpentanediol, 2-methylpropane-1,3-diol, hexamethylene glycol, bisphenol-A and the like. The dicarboxylic acid components useful for modification include aromatic dicarboxylic acids such as isophthalic acid, naphthalene dicarboxylic acid, etc. as well as aliphatic dicarboxylic acids such as adipic acid, azelaic acid, dodecanedioic acid, etc.

The polyester resin used in the composition of the present invention preferably possesses an intrinsic viscosity of at least 0.5 as measured in a concentration of 8% in o-chlorophenol at 23° C.

The polyester resin composition of the present invention, if desired, may further comprise one or more of various additives, for example, reinforcing agents such as glass fibers, whiskers, carbon fibers, glass beads and glass flakes; inorganic fillers such as calcium carbonate, talc, mica and clay; flame-retardants, flame-retarding aids, pigments, dyes, lubricants, antistatics, plasticizers, UV absorbers, antioxidants, blowing agents and the like.

The polyester composition of the present invention can readily be melt processed to form a variety of shaped articles such as molded three-dimensional articles, fibers, films, tapes, tubes, etc. having good mechanical and electrical properties. They are particularly suited for molding applications such as injection molding.

A thermoplastic molding compound may be formed by incorporating a solid filler and/or reinforcing agent in addition to the hydantoin compound in the polyester resin.

The following Examples are given to illustrate the claimed invention. It should be understood, however, that the invention is not limited to the specific details set forth in the Examples. In the Examples, all the parts are by weight.

EXAMPLE 1

To 100 parts of a mixture consisting of 70 parts of polybutylene terephthalate and 30 parts of glass fibers was added 0.1 part of p-hydroxyphenylhydantoin and the mixture was melt kneaded in a 40 mm single screw extruder and extruded therefrom. The extruded material was chopped into pellets and dried in a hot-air oven.

The amount of terephthalic acid evolved during melt processing was measured by passing 4 kg of the dried pellets through an injection molding machine kept at a cylinder temperature of 260° C. in such a manner that the molten resin was allowed to flow freely through the cylinder. Passage of the pellets was completed in 30 minutes, and the evolved gas was collected and absorbed in dimethylsulfoxide. The dimethylsulfoxide solution was then analyzed by ultraviolet spectrophotometry to determine the amount of terephthalic acid therein. The analysis showed that the amount of terephthalic acid absorbed in the dimethylsulfoxide was 0.05 mg/kg of pellets.

COMPARATIVE EXAMPLE 1

The procedure of Example 1 was repeated without addition of p-hydroxyphenylhydantoin and the pellets were tested to determine the amount of evolved terephthalic acid in the same way as described in Example 1. The amount of evolved terephthalic acid was 0.69 mg/kg of pellets.

EXAMPLES 2 and 3

The procedure of Example 1 was repeated except that 0.05 or 0.15 part of p-hydroxyphenylhydantoin was added instead of 0.1 part thereof. The resulting pellets were tested to determine the amount of evolved terephthalic acid as described in Example 1 and the results are summarized below.

| p-Hydroxyphenyl-hydantoin (part) | Terephthalic acid evolved (mg/kg of pellets) |
|---|---|
| 0.05 | 0.10 |
| 0.15 | 0.06 |

Although the invention has been described with a preferred embodiment it is to be understood that variations and modifications may be employed without departing from the concept of the invention as defined in the following claims.

What is claimed is:

1. A thermoplastic polyester composition comprising:
   (a) a thermoplastic polyester resin which contains a moiety derived from an aromatic dibasic acid as a predominant acidic moiety, and
   (b) a hydantoin compound in an amount sufficient to substantially retard evolution of aromatic dibasic acid vapor during melt processing of the composition.

2. The composition according to claim 1 wherein the aromatic dibasic acid is terephthalic acid.

3. The composition according to claim 2 wherein the thermoplastic polyester resin is selected from the group consisting of polyethylene terephthalate, polytrimethylene terephthalate, polytetramethylene terephthalate and a blend thereof.

4. The composition according to any one of claims 1 to 3 wherein the hydantoin compound is hydantoin or a hydantoin compound having a substituent at the 5-position.

5. The composition according to claim 4 wherein the hydantoin compound is selected from the group consisting of phenylhydantoin and p-hydroxyphenylhydantoin.

6. The composition according to any one of claims 1 to 5 wherein the hydantoin compound is present in an amount of from 0.01 to 10 parts by weight per 100 parts by weight of the polyester resin.

7. The composition according to claim 6 wherein the hydantoin compound is present in an amount of from 0.01 to 5 parts by weight per 100 parts by weight of the polyester resin.

8. The composition according to claim 7 wherein the hydantoin compound is present in an amount of from 0.01 to 2 parts by weight per 100 parts by weight of the polyester resin.

9. A molding compound comprising the thermoplastic polyester composition of claim 1 which incorporates a solid filler and/or reinforcing agent.

10. A molded article comprising the thermoplastic polyester composition of claim 1.

11. A method of preventing mold deposits during a molding operation of a thermoplastic polyester resin containing an aromatic dibasic acid as a predominant acid moiety comprising the addition of 0.01–10 parts by weight of a hydantoin compound per 100 parts by weight of the polyester resin.

12. A method according to claim 11 wherein the aromatic dibasic acid is terephthalic acid.

13. A method according to claim 12 wherein the thermoplastic polyester resin is selected from the group consisting of polyethylene terephthalate, polytrimethylene terephthalate, polytetramethylene terephthalate and a blend thereof.

14. The method according to claim 12 wherein the hydantoin compound is hydantoin or a hydantoin compound having a substituent at the 5-position.

15. A method according to claim 14 wherein the hydantoin compound is selected from the group consisting of phenyl hydantoin and p-hydroxyphenyl hydantoin.

16. A method according to claim 12 wherein the hydantoin compound is added in an amount of from 0.01 to 5 parts by weight per 100 parts by weight of the polyester resin.

17. A method according to claim 12 wherein the hydantoin compound is added in an amount of from 0.01 to 2 parts by weight per 100 parts by weight of the polyester resin.

18. A method according to claim 12 wherein the thermoplastic polyester resin further contains a filler or a reinforcing agent.

* * * * *